US008004128B2

(12) United States Patent
Abe

(10) Patent No.: US 8,004,128 B2
(45) Date of Patent: Aug. 23, 2011

(54) ROTATING ELECTRICAL MACHINE
(75) Inventor: Teruyoshi Abe, Hitachi (JP)
(73) Assignee: Hitachi, Ltd., Tokyo (JP)
( * ) Notice: Subject to any disclaimer, the term of this patent is extended or adjusted under 35 U.S.C. 154(b) by 165 days.
(21) Appl. No.: 12/184,267
(22) Filed: Aug. 1, 2008
(65) Prior Publication Data
US 2009/0033180 A1 Feb. 5, 2009
(30) Foreign Application Priority Data
Aug. 1, 2007 (JP) ................. 2007-200292
(51) Int. Cl.
*H02K 11/00* (2006.01)
(52) U.S. Cl. .................... 310/68 B; 310/67 R
(58) Field of Classification Search .............. 310/68 B, 310/67 R, 156.01
See application file for complete search history.
(56) References Cited

U.S. PATENT DOCUMENTS

| | | | |
|---|---|---|---|
| 6,285,101 B1 * | 9/2001 | Kazama et al. | 310/68 B |
| 6,504,275 B2 * | 1/2003 | Nondahl et al. | 310/68 B |
| 7,633,201 B2 * | 12/2009 | Buhler et al. | 310/90.5 |
| 2004/0080229 A1 * | 4/2004 | Haner | 310/166 |
| 2007/0216244 A1 * | 9/2007 | Edelson | 310/90.5 |
| 2009/0039740 A1 * | 2/2009 | Sortore et al. | 310/68 B |
| 2009/0224702 A1 * | 9/2009 | Zhu et al. | 318/16 |

FOREIGN PATENT DOCUMENTS

| | | |
|---|---|---|
| JP | 61-212768 | 9/1986 |
| JP | 63-262083 | 10/1988 |
| JP | 1-098924 | 4/1989 |
| JP | 2-146949 | 6/1990 |
| JP | 2001-204147 | 7/2001 |
| JP | 2007-080102 | 3/2007 |
| JP | U-3133681 | 6/2007 |
| JP | 2008-022631 | 1/2008 |
| WO | WO 2005/106525 | 11/2005 |
| WO | WO 2007/013152 | 2/2007 |

* cited by examiner

*Primary Examiner* — Thanh Lam
(74) *Attorney, Agent, or Firm* — Antonelli, Terry, Stout & Kraus, LLP.

(57) ABSTRACT

A rotating electrical machine having an RF-IC chip for detecting a rotation and also having a stator and a rotor. When a compact RF-IC chip is used as the RF-IC chip, the chip can detect the rotation of the rotating electrical machine.

8 Claims, 8 Drawing Sheets

ROTATING ELECTRICAL MACHINE

BACKGROUND OF THE INVENTION

The present invention relates to a rotating electrical machine which detects a rotation with use of a radio frequency (which will be abbreviated to RF, hereinafter)-IC chip.

As a rotating electrical machine is improved in efficiency by applying a strong permanent magnet or inverter control to the machine, the machine has been made compact in size and light in weight together with an increased efficiency.

The main body of the rotating electrical machine is made increasingly compact and light. A sensor for detecting the rotation of the rotating electrical machine, on the other hand, is still mounted outside of the rotating electrical machine in many cases and occupies a relatively large space. This forms one of important causes of hindering achievement of a rotating electrical machine of a more compact and lighter structure. For this reason, for the purpose of achieving a more compact and light rotating electrical machine including the sensor, it has been demanded to reduce the dimensions of the sensor.

For example, techniques for providing a sensor in the interior of a housing of a rotating electrical machine are disclosed in JP-A-02-146949, JP-A-01-98924, and JP-A-63-262083. However, such disclosed techniques are merely to move a rotational sensor so far used for the rotating electrical machine from the outside of the housing of the rotating electrical machine to the inside thereof.

Meanwhile, we have so far failed to find an example in which an RF-IC chip is used in a sensor for detecting the rotation of the rotating electrical machine.

We also have failed to find an example of using such a sensor for detecting the rotation of a rotating electrical machine on the basis of the Doppler phenomenon of RF wave or a variation in the intensity of the signal.

SUMMARY OF THE INVENTION

As a sensor for detecting the rotation of the rotating electrical machine, a resolver or an encoder is widely used, because the resolver or the encoder can detect a position from its stopped position and be high in detection accuracy and reliability.

Such a prior art sensor is seldom mounted directly to a stator of the rotating electrical machine or rotor thereof because the sensor has a complicated structure and large dimensions, and is separately mounted, in many cases, on the rotary shaft of the rotating electrical machine. This forms one of causes of hindering achievement of a compact and light rotating electrical machine. The prior art sensor also has a problem that the sensor becomes costly because of its complicated structure.

In the case of an ultracompact rotating electrical machine such as a spindle motor, the prior art rotational sensor cannot be mounted to the machine, in not a few cases, because the sensor is large in size and weight. For this reason, no provision of the rotational sensor (which will be referred to as "rotational sensor-less", hereinafter) is provided to the machine or only a Hall element having a highly degraded accuracy or function can be provided to the machine. Thus, in not a few cases, the function or performance of the rotating electrical machine is limited, for example, the rotational speed of the machine is limited to a constant speed.

The rotational sensor has been made increasingly compact and light. For example, when the rotational sensor is a resolver which is one of rotational sensors having the highest accuracy and which is widely used, the resolver itself is a rotating electrical machine, has a complicated mechanism and made up of many components, with result that the sensor has its limit in making the sensor compact and light.

Even with respect to an encoder which is widely used as a highest-accuracy rotational sensor as well as the resolver, the resolver has a complicated mechanism including a scale recording an optically or magnetically change or a light source such as an LED lamp, and also has a number of components, the encoder also has its limit in making the encoder compacter and lighter.

As a result, the rotating electrical machine is hindered from being made compacter and lighter, and the high-accuracy and reliable rotational sensor cannot be disadvantageously mounted to the ultracompact rotating electrical machine.

Since most of such highly-accurate and reliable rotational sensors has a complicated structure and is made up of many components, the price of the sensor becomes high and this leads to hindrance of reduction of the cost of the rotating electrical machine.

It is therefore an object of the present invention to provide a rotating electrical machine which is small in compactness and weight and has a high performance.

In accordance with major one of embodiments of the present invention, there is provided a rotating electrical machine which has a stator and a rotor and which detects a rotation with use of an RF-IC chip, an antenna and a waveguide provided to the rotor and with use of an antenna and a waveguide provided to the stator.

In one of the embodiment of the present invention, in particular, an RF-IC chip is provided.

The RF-IC chip is quickly put in practical use in such applications as IC card or identification tag as main fields. Simultaneously, the chip is correspondingly made compact and its cost is also correspondingly reduced.

There two types of RF-IC chips, that is, a passive type which is operated on electric waves as an energy source from a wave emission source of an electromagnetic induction system (mainly, 135 kHz or 13.56 MHz) or of an electric wave system (mainly, 860-960 MHz or 2.54 GHz), and an active type which is operated on a built-in power supply such as a battery or on a power supplied through an external wire as an energy source.

The RF-IC chip is so far used mainly in information authentication such as reading of information recorded in the IC chip or writing of information therein by moving the IC chip close to a device called a reader/writer.

Meanwhile, since the RF-IC chip can transmit and receive RF waves instantaneously, there is a possibility that the RF-IC chip can be mounted in a moving object or mobile and can function as an ultracompact position or rotation sensor. We have so far failed to notice this fact, and the inventor of this application have paid attention to this respect.

One of prior art examples of applying RF waves to a mobile sensor is a Doppler sensor for crime prevention which utilizes millimeter-wave or microwave. As other examples, a meteorological Doppler radar and a Doppler radar for observing the Earth's surface or ocean are known.

In all of the prior art examples of applying the RF wave to mobile sensors, however, millimeter-wave or microwave is radiated from a fixed radio emission source to a mobile, so that the sensor receives a reflected wave to find a speed or a movement in the mobile.

We have so far failed to find such an example that a source for emitting waves including RF wave is mounted in a mobile to find a speed or a movement in the mobile. This is because, as its major reason, the mounting of the radio emission source other than the RF-IC chip in the mobile involves a problem with power supply to the radio emission source and also a problem that, because this increase the size and weight of the radio emission source, which makes it difficult to mount the radio emission source in the mobile.

With respect to the RF-IC chip, a passive type of RF-IC chip can be used since the chip can eliminate the need of supplying power to the chip from a built-in power source such as a battery or from an external wired line. Thus not only it can be made easy to mount the RF-IC chip as a RF wave emission source in a high-speed movable body, but also a speed or a movement of the movable body can be found based on the Doppler phenomenon (in which the signal frequency of the RF-IC chip varies with a moving speed when the chip is rotated and moved together with a rotor) or on the basis of a variation in the signal intensity. The present invention is directed to paying attention to this fact.

When a speed or a movement in a mobile is found with use of the ultracompact RF-IC chip, the wave emission output of the RF-IC chip is limited. Thus, it is necessary to set the chip close to a signal reader/writer or to the wave transmit/receive antenna.

In the rotating electrical machine of the present invention, the rotor is rotated with the stator always located close to the rotor. Therefore, the RF-IC chip is suitable because the RF-IC chip as an RF wave emission source is mounted in such a high-speed movable body to find a speed or a movement in the movable body by utilizing the Doppler phenomenon or a variation in the signal intensity. In other words, the RF-IC chip is suitable as an ultracompact rotational sensor using the RF wave.

In the rotating electrical machine of the present invention, in general, an RF-IC chip, an antenna for transmitting and receiving RF wave to and from the RF-IC chip, and a waveguide are provided to a rotor; whereas an antenna for transmitting and receiving RF wave from and to a reader/writer and a waveguide are provided to a stator.

Similarly to applications of conventional IC cards or identification tags, the transmit/receive antenna or the waveguide may be provided in the form of a sheet shape processed by printing or the like.

Generally speaking, the RF-IC chip is made more inexpensively or compacter than the prior art rotational sensor. Thus it is also possible to increase a intensity or a reliability of a signal or to increase a reliability against a trouble such as a failure, by setting a plurality of such RF-IC chips in the rotating electrical machine together with a plurality of such transmit/receive antennas.

Further, even when the stator and the rotor of the rotating electrical machine are made of such a material, e.g., a metal as to easily reflect RF wave, the performance of the rotating electrical machine can be increased by selecting the material and shape of the antenna or the waveguide which can easily guides the RF wave.

Since the RF-IC chip has a function of holding various sorts of pieces of information, it is possible to access or register such information from or in the RF-IC chip as necessary (which will be referred to as reading/writing, hereinafter); the function can also be applied to the operation, control, maintenance, inspection, management, etc. of the rotating electrical machine.

Even when it is desired to mount this system on the surface of the stator and rotor of the rotating electrical machine, the system may be provided in the interior of the machine.

The system can be mounted directly on the stator or the rotor of the rotating electrical machine, and also can be mounted in a mechanism separately provided on a rotary shaft of the rotating electrical machine.

In accordance with the present system, problems in the prior art rotational sensor, which have formed serious ones of problems of hindering the miniaturization and weight reduction of the rotating electrical machine, can be solved, thus enabling achievement of a compact and light rotating electrical machine.

In addition, since the present invention has a simple arrangement including only the RF-IC chip, the transmit/receive antenna and the waveguide, which has been being rapidly reduced in cost in these years; the rotating electrical machine can be reduced in cost.

The stator in the rotating electrical machine of the present invention includes an iron core having teeth and slots and also includes a winding provided around the slots. The rotor in the machine has permanent magnets. When an AC current flows through the stator winding, a rotational torque takes place and rotates the rotor.

The rotation of the rotor caused by the rotational torque causes an AC power to be induced in the stator winding, so that an AC current is output from the stator winding.

When the RF-IC chip is rotated and moved together with the rotor, the rotation of the rotor may be detected by utilizing such a phenomenon that the signal frequency of the RF-IC chip varies according to the movement speed. When the RF-IC chip is rotated and moved together with the rotor, the rotation of the rotor may be detected by utilizing such a phenomenon that the signal intensity of the RF-IC chip varies according to the movement distance.

The RF-IC chip, the antenna, and the waveguide may be mounted on the rotary shaft of the rotating electrical machine or to a rotating electrical machine separately provided.

In accordance with the present invention, a rotating electrical machine having a compact and light structure can be provided with a low cost.

Other objects, features and advantages of the invention will become apparent from the following description of the embodiments of the invention taken in conjunction with the accompanying drawings.

DESCRIPTION OF THE EMBODIMENTS

In one of rotating electrical machines to be explained herein, a rotator is rotated by a combined force of operations of a stator winding, rotor magnets and so on.

Enumerated as the rotating electrical machine is, for example, a vehicle driving motor used for a hybrid electric vehicle, a motor for power steering of a vehicle, a motor for driving an electric train, a motor for driving an elevator, a spindle motor for use in a hard disk drive (HDD), or a general-purpose motor for a pump or the like.

Also used as the rotating electrical machine is a so-called electric generator in which an external rotational torque of a rotor causes an AC power to be induced in a stator winding, so that an AC current is output from the stator winding.

In the generator, it is preferable herein that a 3-phase AC power be induced in the stator winding and a 3-phase AC current be output from the stator winding.

In this connection, a single rotating electrical machine can also be used to have a function corresponding to a combination of the both functions of the rotating electrical machine and the generator.

One of embodiments of the rotating electrical machine of the present invention is a synchronous motor having permanent magnets. The synchronous motor has a stator and a rotor. The stator includes an iron core having teeth and slots and also includes a winding provided in the slots. The stator core (which will sometimes be referred to as the core) is made of laminated steel sheets or the like. In this connection, each of the laminated steel sheets can be formed by etching to form an accurate steel sheet.

Figure 1:
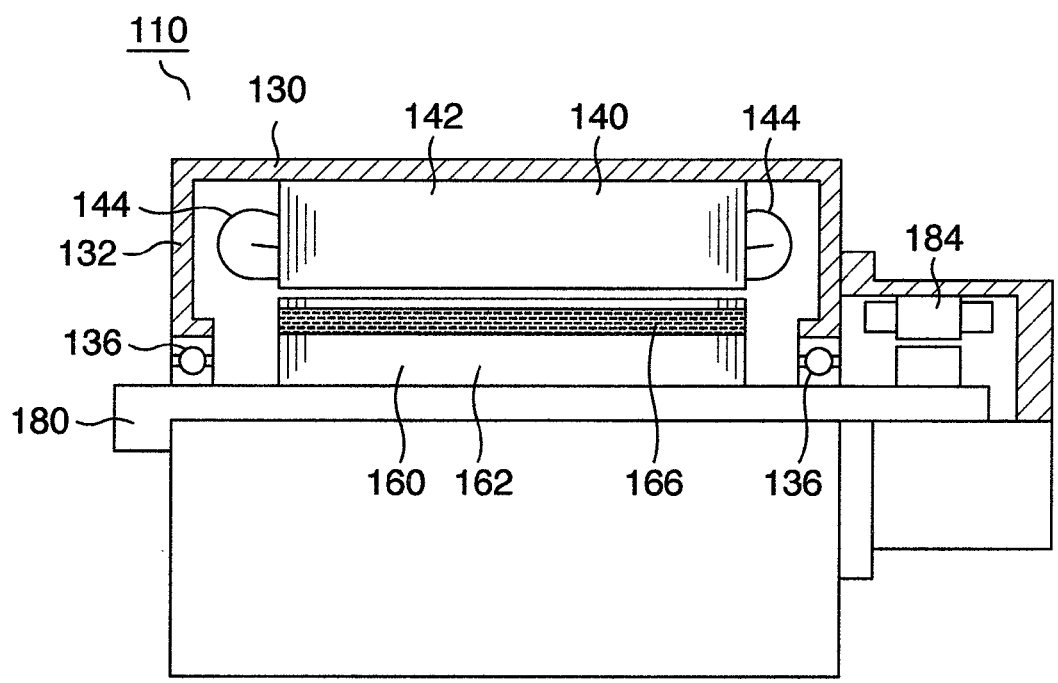
FIG. 1 shows a cross-sectional view of a permanent magnet motor having a stator and a rotor taken along a plane including the longitudinal rotary axis of the rotor.

FIG. 1 shows a cross-sectional view of a stator and a rotor taken along a plane including a longitudinal rotary shaft in a synchronous motor using permanent magnets as the rotating electrical machine.

Figure 2:
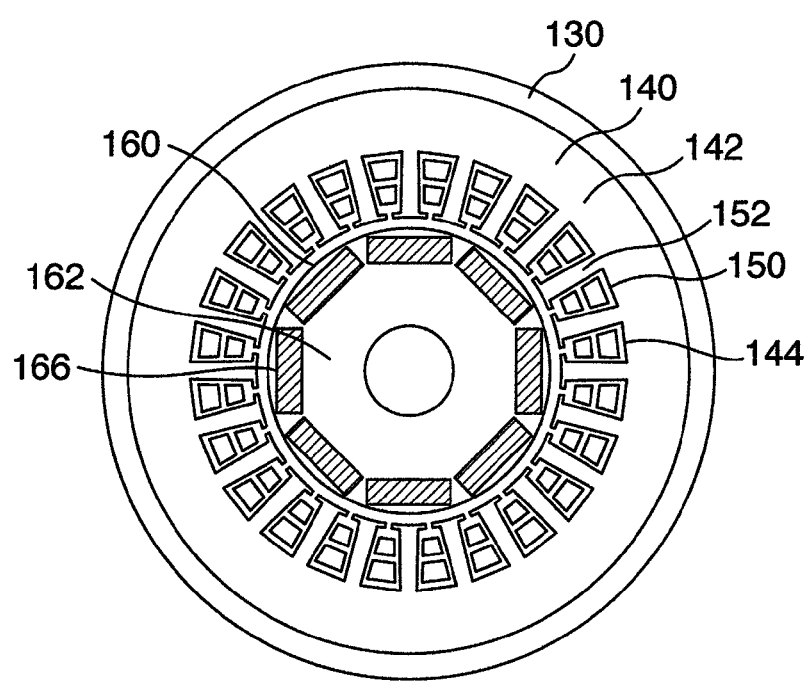
FIG. 2 shows a cross-sectional view of a permanent magnet motor having a stator and a rotor, taken along a plane the rotary axis of rotor.

FIG. 2 shows a cross-sectional view of the synchronous motor using the permanent magnets, taken along a plane vertical to the rotary axis of the motor.

Figure 3:
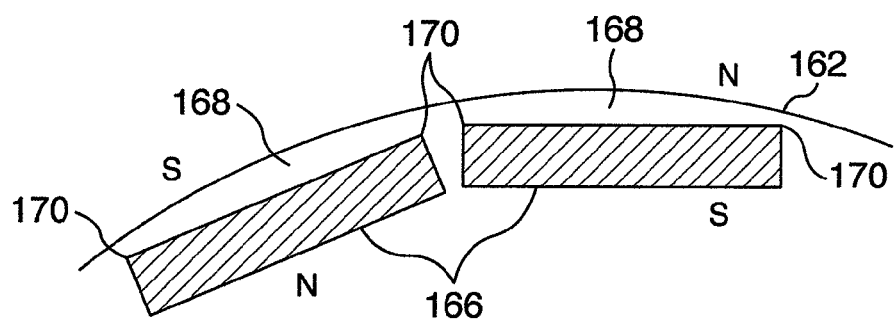
FIG. 3 shows an enlarged part of the cross-sectional view of the permanent magnet motor taken along the plane perpendicular to the rotary axis of the rotor.

FIG. 3 shows a partially enlarged part of the rotor in FIG. 2.

A stator 140 is fixed inside of a housing 130 having end brackets 132 provided at its both sides. The stator 140 includes an iron core 142 having teeth 152 and slots 150 and also includes a winding 144 located inside of the stator slots 150.

The stator winding 144 shown in FIG. 2 is of a distributed type as an example.

A rotor 160 is provided to be opposed to the stator core 142 with a gap defined therebetween, and the rotor 160 is fixed to a shaft 180. The shaft 180 is journalled in bearings 136 to be rotatably supported in the end bracket 132.

The rotor 160 has an iron core 162 and permanent magnets 166. In the case of FIG. 1 and FIG. 2, magnet insertion holes are provided in the rotor core 162, and the permanent magnets 166 are located in the magnet insertion holes.

Each of the permanent magnets 166 is magnetized so as to have an N or S poles at its side face opposed to the stator 140, and the polarities of the poles of the permanent magnets are alternately reversed to the polarities of the poles of the rotor 160.

In the case of FIG. 3, the rotor 160 has 8 poles, each of which is provided as the single permanent magnet 166. The permanent magnets 166 are arranged around the periphery of the shaft 180 at an identical angle therebetween, and the permanent magnets 166 are also magnetized to have alternately opposed polarities.

The number of poles in the rotor 160 is not limited to 8 and may be set at 10 or more, or at 6 or 4.

Each pole may be provided as a single permanent magnet or as a plurality of magnets, for example, as 2 or 3 magnets. When the number of poles is 2 or 3, the permanent magnets are arranged so that the polarities of the magnetized poles are inverted for each of 2 or 3 poles.

In FIG. 1, a synchronous rotating electrical machine 110 has a sensor 184 which detects a rotational position of the rotor 160 and which outputs a signal indicative of a position of the pole of the rotor 160. The sensor 184 is a prior art rotational sensor which has, for example, a resolver or a Hall element.

A 3-phase AC current based on the position of the pole of the rotor 160 is generated by an inverter device not illustrated on the basis of the output of the sensor 184, and then supplied to the stator winding 144.

The stator 140 generates a rotating magnetic field from the 3-phase AC current, and a magnetic flux based on the rotating magnetic field acts on the rotor 160. The permanent magnets 166 of the rotor 160 and the rotating magnetic field cause a rotational torque to be generated in the rotor 160. An output of the rotational torque causes the synchronous rotating electrical machine 110 to be operated as a rotating electric motor.

Application of an external rotational torque to the stator 140 causes an AC power to be generated in the stator winding 144. When the AC power is output as an AC or DC current to a rectification circuit including an inverter or a diode not shown, the synchronous rotating electrical machine 110 is operated as an electric generator.

FIG. 3 shows a partially enlarged view of the rotor 160, in which the permanent magnets 166 are buried in the rotor core 162. The rotor core 162 has magnet insertion holes formed therein, and the permanent magnets 166 are arranged in the respective magnet insertion holes.

The permanent magnets 166 have poles opposed to each other in magnetizing direction. In other words, the permanent magnets 166 are magnetized so that, when the permanent magnet has an N pole opposed to the stator, the permanent magnets provided at both sides of the permanent magnet in question have S poles opposed to the stator.

Parts of the permanent magnets 166 in the rotor core 162 opposed to the stator act as partial magnetic pole pieces 168. Thus a magnetic circuit is established between the rotor and the stator through the partial magnetic pole pieces 168, so that magnetic fluxes of the permanent magnets 166 are supplied to the stator through the magnetic circuit having the partial magnetic pole pieces 168 or supplied from the stator to the permanent magnets 166.

The sides of adjacent ones of the permanent magnets in the rotor opposed to the stator have opposed polarities. A magnetic flux may leak between the partial magnetic pole pieces 168 of the adjacent poles. To prevent it, bridges 170 for preventing leakage of the magnetic flux between the adjacent poles of the rotor.

A cross section area through which a magnetic flux flows is restricted at the bridge 170. The magnetically saturated state of the magnetic flux at this bridge enables suppression of a leakage magnetic flux.

The rotating electrical machine explained in FIGS. 1, 2 and 3 is a permanent magnet synchronous motor of, e.g., a 50 kw class, and the stator core has an outer diameter of about 190 mm and an axial length of 130 mm.

Figure 4:
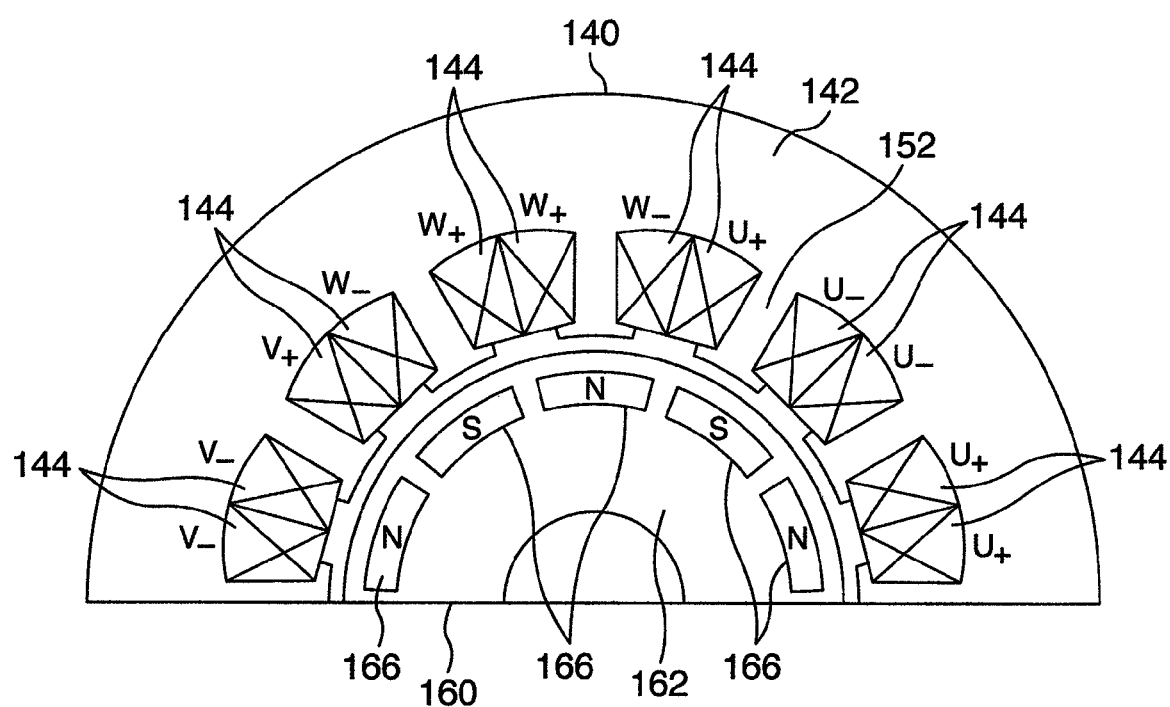
FIG. 4 shows a partial cross-sectional view of a permanent magnet motor having permanent magnets having a curved shape.

FIG. 4 shows part of the synchronous rotating electrical machine explained in FIGS. 1, 2 and 3. However, FIG. 4 is different from the type of FIGS. 1, 2 and 3 in that the stator winding 144 is of a concentrated type and that each magnet has a curved shape as shown in FIG. 4.

In FIG. 4, constituent elements having the same reference numerals as those in FIGS. 1, 2 and 3 have the same functions.

The synchronous rotating electrical machine shown in FIG. 4 has substantially the same arrangement as the synchronous rotating electrical machine shown in FIG. 1. The stator winding 144 located in the stator slots of the stator core 142 shown in FIG. 4 is of a concentrated winding type. That is, the arrangement of the stator winding 144 is different from that of the stator winding 144 shown in FIG. 2.

The stator winding 144 can be formed as a distributed winding type or a concentrated winding type, any one of types can be applied to the present type.

The rotor 160 shown in FIG. 4 has 10 poles. However, the number of poles are not especially restricted to 10 but may be set at a number larger than or smaller than 10. Each pole of the rotor 160 is formed as a single permanent magnet 166, but may be formed to be made up of a plurality of permanent magnets.

In the present type, magnet insertion holes having a curved shape are formed in the rotor core 162, and magnets having a curved shape are inserted in the respective magnet insertion holes. As in the embodiment explained in FIG. 2, a magnetic flux leaks into or out of the surface of the rotor opposed to the stator.

Figure 5:
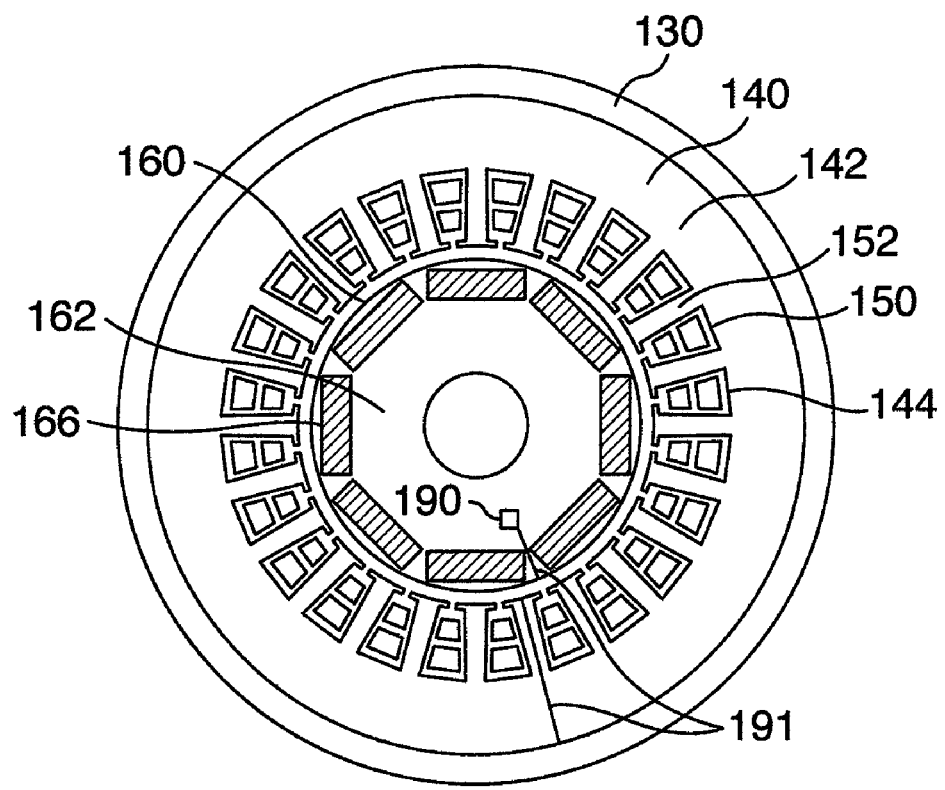
FIG. 5 shows the cross-sectional view of the permanent magnet motor having the stator and the rotor in the embodiment of the present invention, taken along the plane perpendicular to the rotary axis of the rotor.
Figure 6:
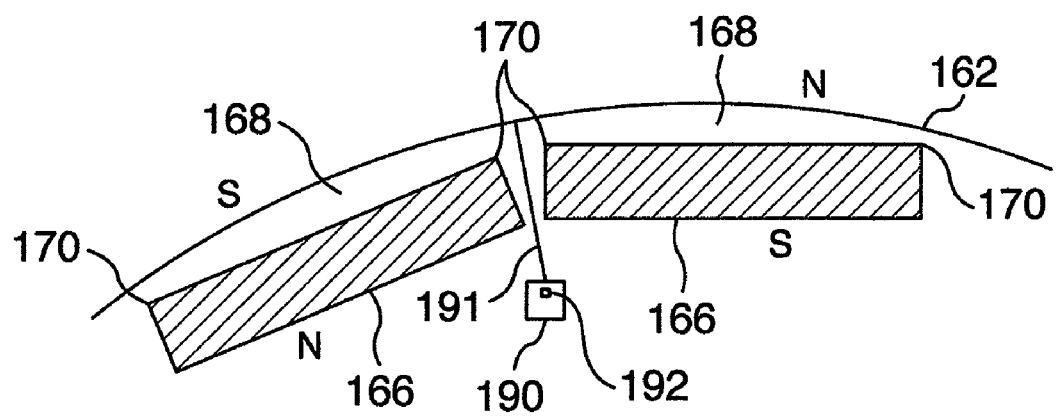
FIG. 6 shows the enlarged part of the cross-sectional view of the permanent magnet motor in the embodiment of the present invention, taken along the plane perpendicular to the rotary axis of the rotor.

In FIGS. 5 and 6, reference numerals 190, 192 and 191 denote an RF-IC chip, an antenna and a waveguide in the present embodiment respectively. Other components have the same reference numerals as those in FIG. 2.

The RF-IC chip 190 is mounted on the rotor; whereas, the antenna 192 and the waveguide 191 are mounted on the stator at optimum positions. The RF-IC chip 190 may be formed on a steel sheet. Or, when the steel sheet is formed by etching, the RF-IC chip may be formed within the steel sheet at a suitable position. The waveguides 191 provided on the stator and on the rotor are opposed at their tip ends to each other. The antenna 192 is built in the RF-IC chip 190.

Figure 7:
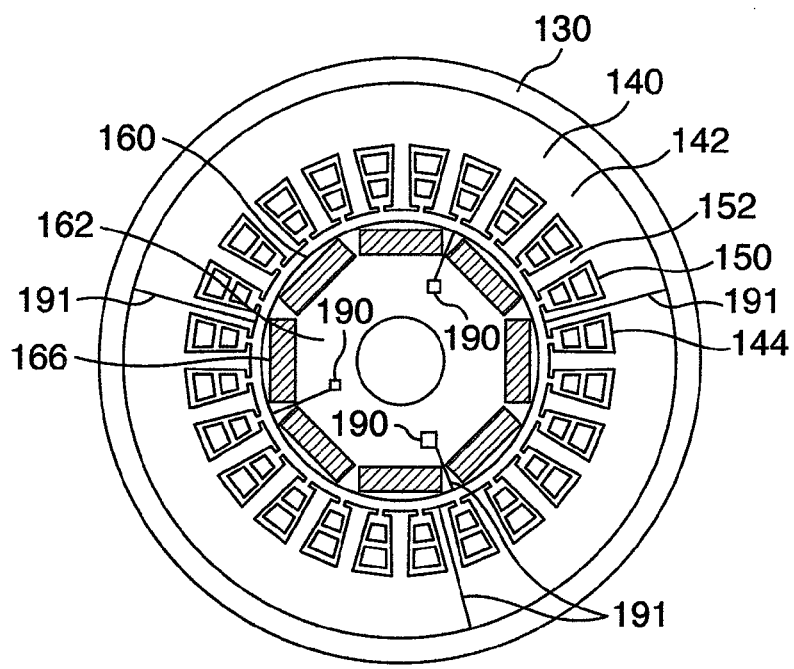
FIG. 7 shows the cross-sectional view of the stator and the rotor of a permanent magnet motor in the embodiment of the present invention, taken along the plane perpendicular to the rotary axis of the rotor.

FIG. 7 shows an example when a plurality of such RF-IC chips, a plurality of such antennas, and a plurality of such waveguides are set in this embodiment.

In the present embodiment, the performance, material, shape, etc. of the RF-IC chip 190, antenna 192 and waveguide 191 can be suitably selected so as to exhibit the performance of a combination of these components as a rotational sensor.

Figure 8:
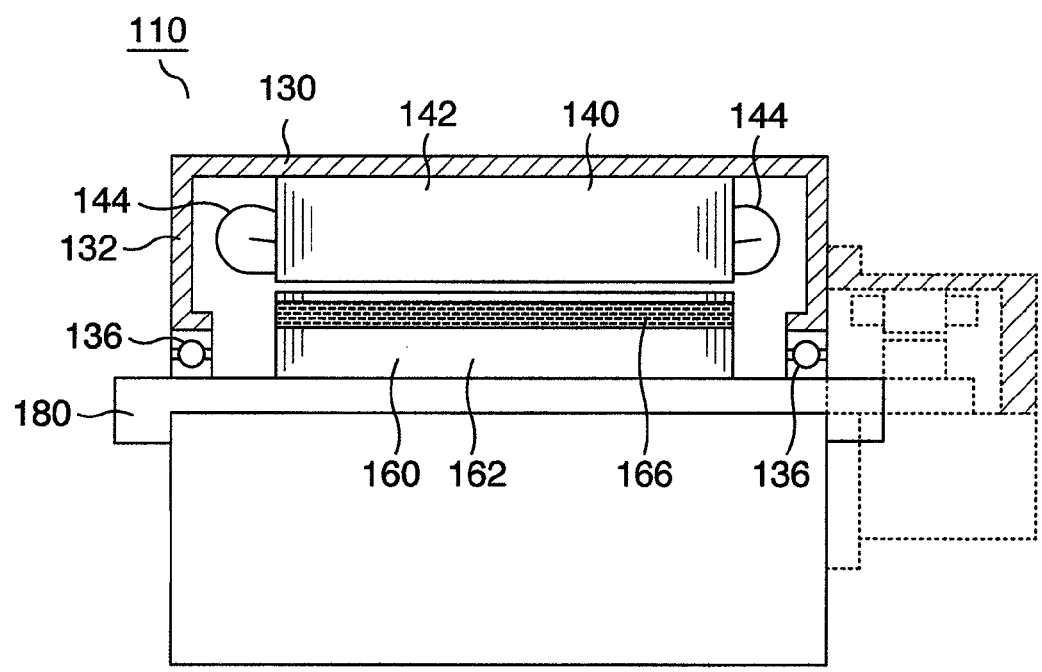
FIG. 8 is a diagram for explaining a reduction in the volume of the permanent magnet motor of the embodiment.

In the embodiments explained in FIGS. 5, 6 and 7, since the volume occupied by the sensor can be minimized, the volume of a rotating electrical machine can be reduced as shown in FIG. 8. From comparison with FIG. 1, it will be seen that a difference therebetween in effect is obvious.

Figure 9:
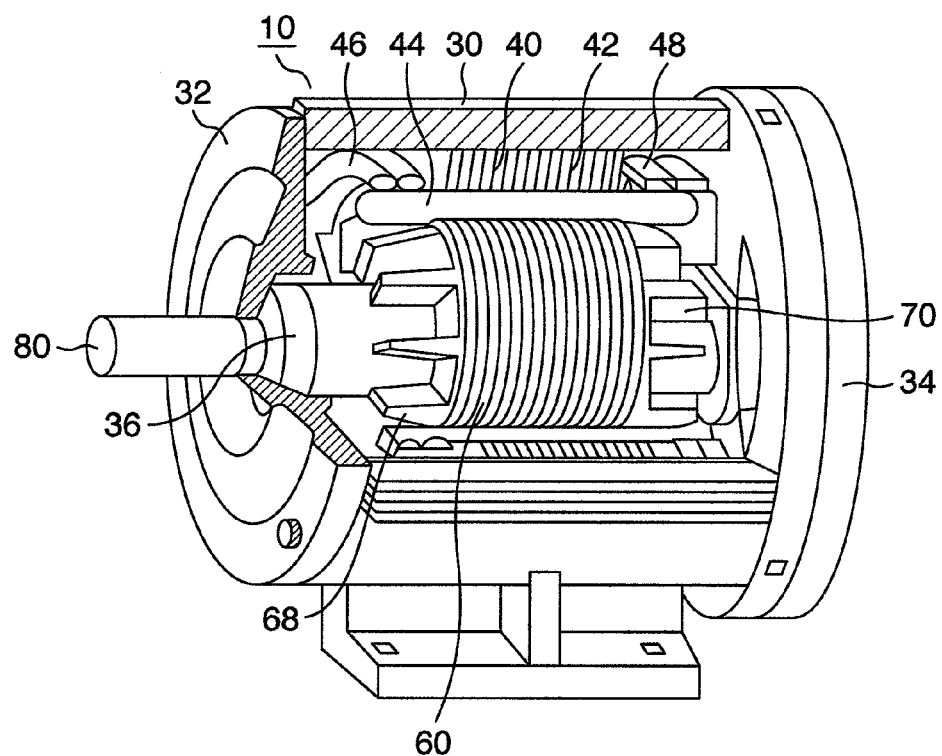
FIG. 9 is a perspective view of an induction motor with cross-sectional views taken along planes including the longitudinal rotary axis of the motor.

FIG. 9 is a 3-phase induction motor as an example of the rotating electrical machine, with cross-sectional views taken along planes including the longitudinal rotary axis of the motor.

The induction motor has a stator and a rotor. The stator includes an iron core having teeth and slots and also includes a winding located in the slots. The stator core is made of laminated steel sheets.

Detailed explanation will be made as follows.

An induction motor to be explained herein functions as a so-called rotating electrical machine in which flowing of an AC current through a stator winding causes a rotational torque to take place and thus a rotor to be rotated.

In this type, it is preferable that a 3-phase AC current flow through the stator winding.

An induction motor 10 includes a housing 30, end brackets 32, a fan cover 34 having a fan therein, a stator 40 fixed inside of the housing 30, a rotor 60 located inside of the stator 40, and a shaft 80 having the rotor 60 mounted thereon.

The shaft 80 is journalled in bearings 36 provided in the both side end brackets 32.

A fan fixed to the shaft 80 is provided inside of the fan cover 34 so that the fan rotates together with the rotation of the shaft 80. The fan-side end bracket 32, the fan-side bearing 36 and the fan are located inside of the fan cover 34, these components are not illustrated in FIG. 10.

The stator 40 includes an iron core 42 and a multi-phase (3-phase in the present type) winding 44 wound around the stator core 42.

An AC current is supplied from AC terminals not shown through lead wires 46 to the stator winding 44, and the stator winding 44 is wound in a star connection or in a delta connection. The lead wires 46 and a connection 48 are located outside the stator winding 44 respectively.

A 3-phase AC current is supplied from an external AC source to an AC terminal of the induction motor 10 and further supplied via the lead wires 46 to the stator winding 44, so that the stator 40 generates a rotating magnetic field based on the frequency of the AC current. The rotating magnetic field causes a rotor current to be induced in a conductor of the rotor 60, so that an interaction between the rotor current and the rotating magnetic field produces a rotational torque.

Figure 10:
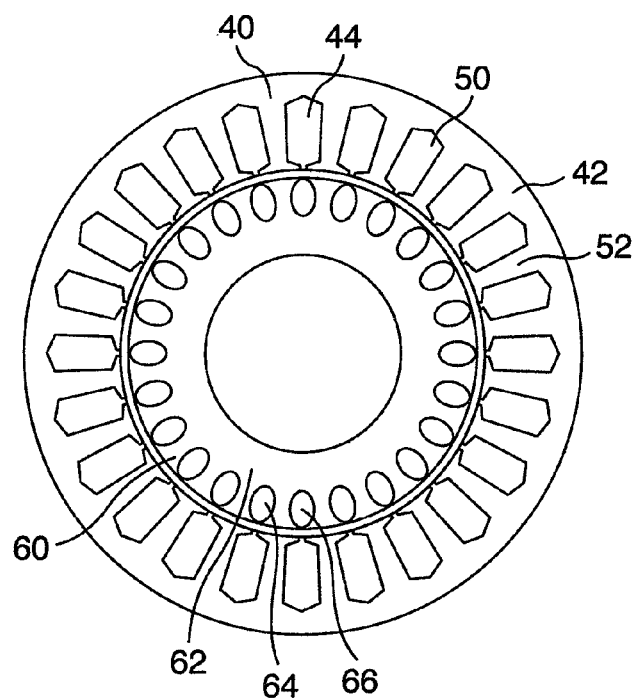
FIG. 10 shows a cross-sectional view of an induction motor having a stator and a rotor, taken along a plane perpendicular to the rotary axis of the rotor.

FIG. 10 shows a cross-sectional view of the stator 40 and the rotor 60 in FIG. 9 taken along a plane vertical to the longitudinal rotary axis.

In FIGS. 9 and 10, the stator 40 has a multiplicity of stator slots 50 arranged at an identical spacing therebetween along its circumferential direction, and the stator winding 44 is located in the stator slots 50.

The rotor 60 includes an iron core 62 made of laminated silicon steel sheets, conductors 66 inserted in slots 64 formed in the rotor core 62, a short-circuit ring 68 and a short-circuit ring 70 located at both ends of the rotor core 62 for electrically short-circuiting the rotator conductors 66.

In the present type, the rotor slots 64 are formed to pass through the rotor core 62, and the rotator conductors 66 are arranged in the rotor slots 64 in a direction along the rotary axis of the rotor.

The rotor slots 64 may be formed inside of the rotor core 62 to have such a shape as to pass through the rotor slots 64. Or the rotor slots 64 are not completely buried in the interior of the rotor core 62 but may have such a shape as to be open at the side of the rotor slots 64 opposed to the stator 40.

The rotator conductors 66 are electrically short-circuited at its both sides by the short-circuit rings 68 and 70, a rotating magnetic field causes a voltage to be induced in the rotator conductors 66 short-circuited by the short-circuit rings 68 and 70 and also causes a current to flow through the rotator conductors 66. An interaction between the current and the rotating magnetic field produces a rotational torque to the rotor 60.

The rotor slots 64 are formed in the rotor core 62 made of laminated silicon steel sheets at an identical spacing therebetween along the outer periphery of the rotor core 62, the rotator conductors 66 are inserted in the respective rotor slots 64 arranged at an identical spacing, so that the rotator conductors 66 are arranged at an identical spacing in the circumferential direction of the rotor core 62.

The rotator conductors 66, which are made of a material containing, e.g., copper as its main component, may be inserted in the rotor slots 64 to be electrically short-circuited at their both ends by the short-circuit rings, or the conductors and the short-circuit rings may be made by aluminum die casting.

The aluminum die casting means such a method that the rotor core 62 is put in a die, molten aluminum is poured into the die to form the rotator conductors 66 inside of the rotor slots 64 of the rotor core 62 and also to form the short-circuit rings 68 and 70.

The aluminum die casting has a merit that manufacturing is easy, but also has a demerit that a loss is large because the rotator conductors 66 are made of aluminum having a somewhat large electric resistance.

As a method of compensating for the aforementioned demerit, there is a method of molten aluminum is poured in the die with copper wires inserted inside of the rotor slots 64.

As a method other than the aluminum die casting, there is a method of electrically connecting short-copper-made circuit rings with the rotator conductors 66 by insert copper conductor bars in the rotor slots 64 and welding the bars to the short-circuit rings. In this method, a loss can be made highly small.

In order to reduce a core loss caused by generation of an eddy current the stator core 42 and the rotor core 62 have a structure of laminated copper sheets.

Since the eddy current is proportional to the frequency of variations in the magnetic flux, the eddy current increases in proportion to an increase in the frequency of a rotating magnetic field. As the number of poles in the stator 40 increases, the frequency of variations of a magnetic flux is increased. Thus the eddy current increases in proportion to an increase in the number of poles. Accordingly, an increase in the frequency of the magnetic flux or in the number of poles causes an eddy current loss to be increased.

The magnitude of the eddy current loss increases based on the sheet thickness. Hence, as the sheet thickness increases, the eddy current loss is abruptly decreased.

Figure 11:
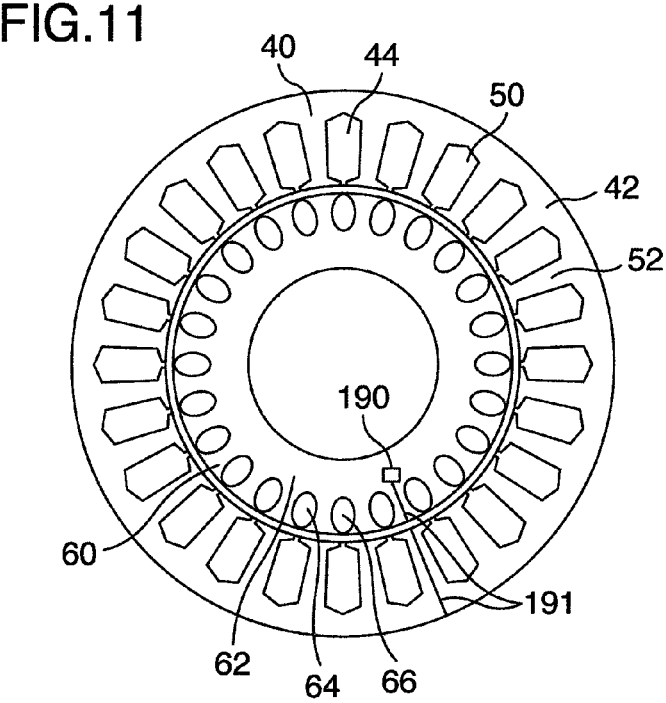
FIG. 11 shows a cross-sectional view of the induction motor having the stator and the rotor in the embodiment of the present invention, taken along the plane perpendicular the rotary axis of the rotor.
Figure 12:
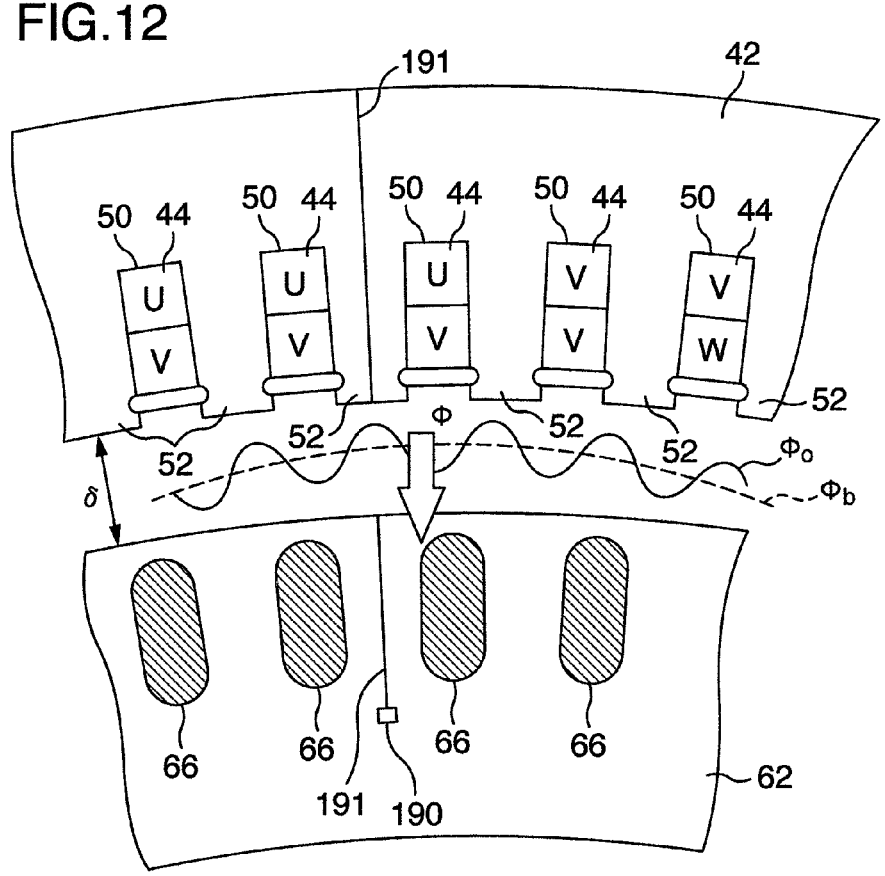
FIG. 12 shows an enlarged part of the cross-sectional view of the induction motor having the stator and the rotor in the embodiment of the present invention, taken along the plane perpendicular to the rotary axis of the rotor.

In FIGS. 11 and 12, reference numerals 190 and 191 denote an RF-IC chip and a waveguide in the present embodiment respectively.

The RF-IC chip 190 is mounted on the rotor at a suitable position, and the waveguide 191 is mounted on the stator at a suitable position.

Figure 13:
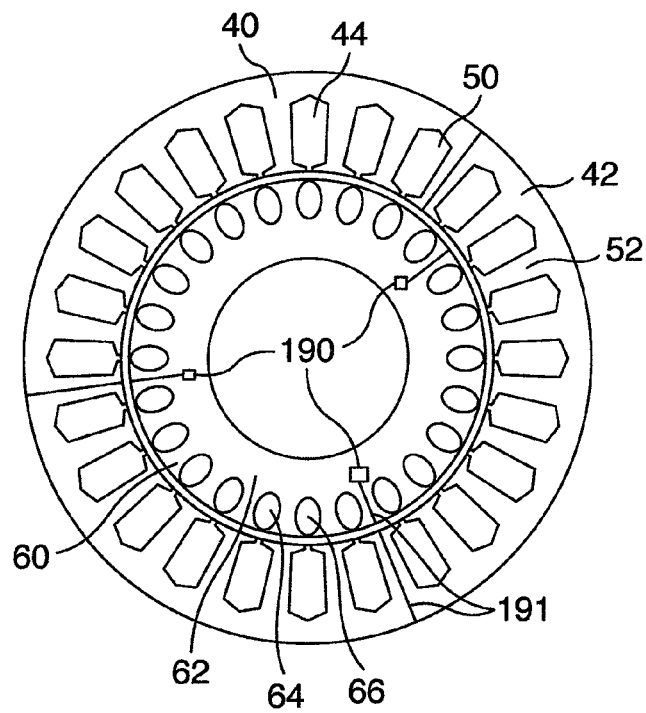
FIG. 13 shows the cross-sectional view of the induction motor having the stator and the rotor in the embodiment of the present invention, taken along the plane perpendicular to the rotary axis of the rotor.

FIG. 13 shows an embodiment when a plurality of such RF-IC chips, a plurality of such antennas and a plurality of such waveguides in the above embodiment are provided.

The performance, material, shape, etc. of the RF-IC chip, antenna and waveguide can be suitably selected so that a combination thereof can exhibit its performance as a rotational sensor.

In the embodiment explained in FIGS. 11, 12 and 13, since the volume occupied by the sensor can be made small, the volume of the rotating electrical machine can be reduced as in the synchronous motor shown in FIG. 8.

Figure 14:
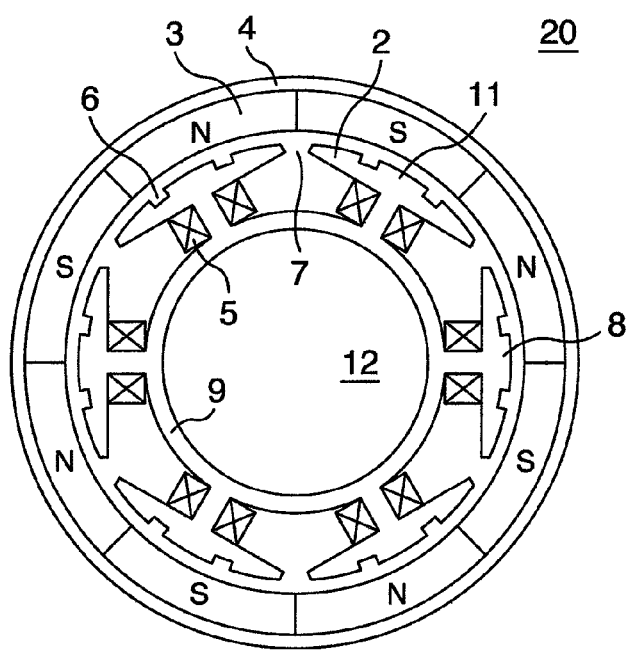
FIG. 14 shows a cross-sectional view of a spindle motor having a stator and a rotor, taken along a plane perpendicular to a rotary axis of a rotor.

FIG. 14 shows a spindle motor in accordance with an embodiment of the present invention.

The spindle motor of the present embodiment is a permanent magnet motor of an outer rotor type, which is a spindle motor of a so-called 4:3 structure having 12 poles of a rotor 20 and 9 poles of a stator 12. The rotor 20 has 12 permanent magnets 3 and a hub 4 for fixing the permanent magnets 3. The stator 12 has 9 projection parts 11, and a stator coil 5 is wound around projected poles 8 of the projection parts 11. Correction grooves 6 are formed in the surface of projected pole ends 2 opposed to the permanent magnets 3 at two locations close to the center of the projected pole 8.

As a method of detecting the position of the pole of the permanent magnet 3, there is a rotational sensor-less type method based on a Hall element provided on a housing 1 or on the detection of a voltage induced in the stator coil 5. In this method, however, such a reliable rotational sensor, which is capable of detecting a position at which a resolver or the like stops and has a high detection accuracy, is not used.

Since such a sensor becomes bulky and has a high cost as main reasons, the function of the spindle motor is limited to being driven at a constant speed.

When the motor is limited to being driven at a constant speed, there always exists a difference in rotating speed between outer and inner peripheries of a memory medium such as a hard disk in an HDD. Thus use of such a spindle motor has a problem that there is a difference in memory density per storage area between the outer and inner peripheries of the storage medium. The use of such a spindle motor at a constant high speed regardless of variations in rotational load has another problem that a load variation caused by some reason in a low temperature situation as upon start of the motor causes a power consumption to be increased or a trouble to easily take place.

For this reason, the spindle motor is manufactured under such strict production control conditions that a production environment or manufacturing conditions be strictly controlled. This disadvantageously makes it difficult to reduce its manufacturing cost.

When an ultracompact, accurate and reliable rotational sensor can be mounted to the spindle motor, accurate and flexible rotational control based on the rotational sensor can be achieved and the aforementioned problems can also be resolved. The reduction off cost of the spindle motor itself can be made due to relaxing of the strict production control conditions.

Figure 15:
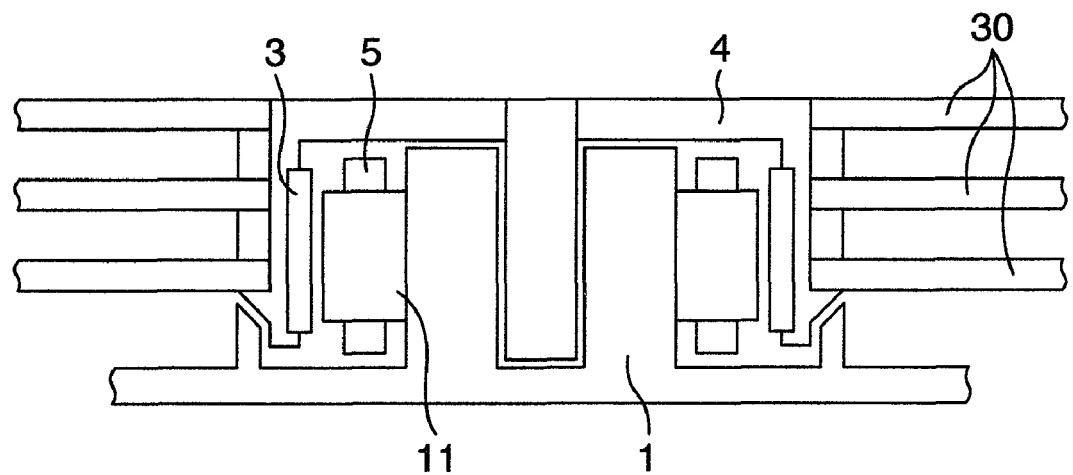
FIG. 15 shows a cross-sectional view of an HDD taken along a plane including the longitudinal rotary axis of the HDD.

FIG. 15 shows an example of an HDD using the spindle motor according to the embodiment of the present invention. The spindle motor used in the HDD in the present embodiment is of an outer rotator type explained in FIG. 14.

Figure 16:
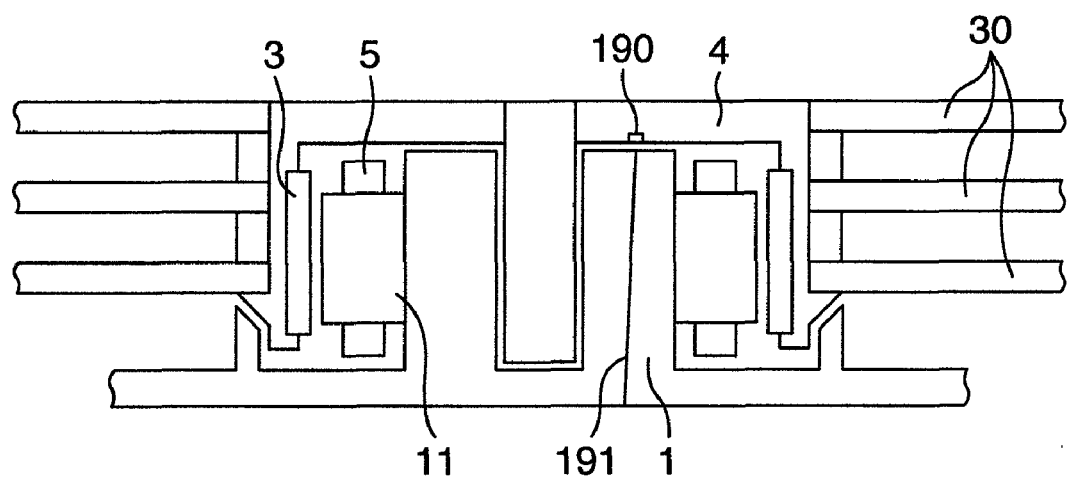
FIG. 16 shows a cross-sectional view of an embodiment of the HDD taken along a plane including the longitudinal rotary axis of the HDD.

In FIG. 16, reference numerals 190 and 191 denote an RF-IC chip having an antenna and a waveguide in the present embodiment respectively.

The RF-IC chip 190 is mounted on the rotor at a suitable position, and the antenna and waveguide 191 is mounted on the stator at a suitable position.

As in the embodiments already explained in the foreign, a plurality of such RF-IC chips, a plurality of such antennas and a plurality of such waveguides may be provided. In addition, the performance, material, shape, etc. of the RF-IC chip, antenna and waveguide may be suitably selected according to their mounting positions so as to exhibit the performance of a combination of such components as a rotational sensor.

The HDD has been provided as an example of the spindle motor. However, even when the present invention is applied to such CD-ROM or DVD device as to read/write information from/in a disk, the invention can exhibit effects similar to the above embodiments.

The present invention can be used as a rotating electrical machine such as a rotating motor or a generator.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A rotating electrical machine comprising a stator and a rotor,
wherein an RF-IC chip of electromagnetic induction type or electric wave type, a first antenna and a first waveguide are provided to the rotor, and a second antenna and a second waveguide are provided to the stator, wherein a signal reader/writer is adapted to receive a signal from the RF-IC chip by utilizing the first antenna, the first waveguide, the second antenna and the second waveguide, and determines a speed or a movement of the rotor based on the signal from the RF-IC chip by utilizing Doppler phenomenon or a variation of intensity of the signal when the rotor is rotated.

2. The rotating electrical machine according to claim 1, wherein the stator includes an iron core having teeth and slots and also includes a winding located in the slots.

3. The rotating electrical machine according to claim 1, wherein the rotor has permanent magnets.

4. The rotating electrical machine according to claim 1, wherein flowing of an AC current through a stator winding of the stator causes a rotational torque to take place and also causes the rotor to be rotated.

5. The rotating electrical machine according to claim 1, wherein rotation of the rotor by an external rotational torque causes an AC power to be induced in a stator winding of the stator and causes an AC current to be output from the stator winding.

6. The rotating electrical machine according to claim 1, wherein the RF-IC chip is operated on electric wave from a wave emission source as an energy source in an electromagnetic induction system or in an electric wave system.

7. The rotating electrical machine according to claim 1, wherein various types of pieces of information can be accessed and registered from and in the RF-IC chip.

8. A rotating electrical machine comprising:
a stator;
a rotor;
an RF-IC chip of electromagnetic induction type or electric wave type provided to the rotor for transmitting and receiving a signal as an RF wave via an antenna, and
a waveguide provided to the rotor; and
a waveguide provided to the stator for guiding RF waves between an antenna provided to the stator and a signal reader/writer,
wherein the signal reader/writer determines a speed or a movement of the rotor based on the signal from the RF-IC chip by utilizing Doppler phenomenon or a variation of intensity of the signal when the rotor is rotated,
wherein the RF-IC chip stores information and the information is read out from the RF-IC chip by the signal reader/writer through the antennas and waveguides of the rotor and stator.

* * * * *